Jan. 29, 1935.    H. S. CAMPBELL    1,989,544
AIRCRAFT OF THE ROTATIVE SUSTAINING BLADE TYPE
Original Filed April 8, 1931    3 Sheets-Sheet 1

INVENTOR
BY *Harris S. Campbell*
*Symestrott & Lechner*
ATTORNEYS

Jan. 29, 1935.    H. S. CAMPBELL    1,989,544
AIRCRAFT OF THE ROTATIVE SUSTAINING BLADE TYPE
Original Filed April 8, 1931    3 Sheets-Sheet 2
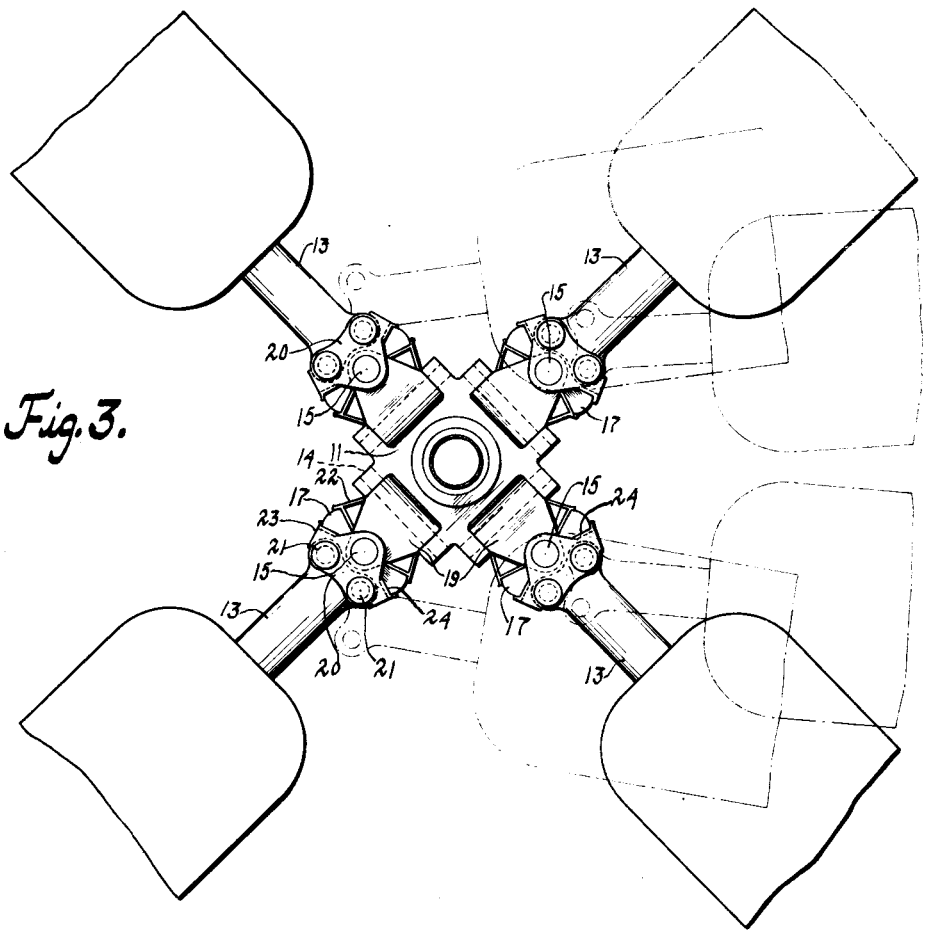
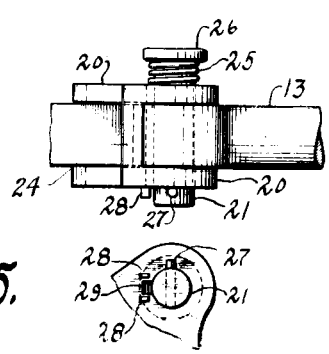
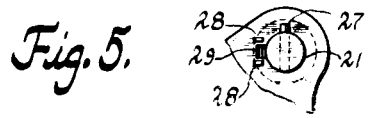
INVENTOR
Harris S. Campbell
BY
ATTORNEYS Jan. 29, 1935. H. S. CAMPBELL 1,989,544
AIRCRAFT OF THE ROTATIVE SUSTAINING BLADE TYPE
Original Filed April 8, 1931  3 Sheets-Sheet 3
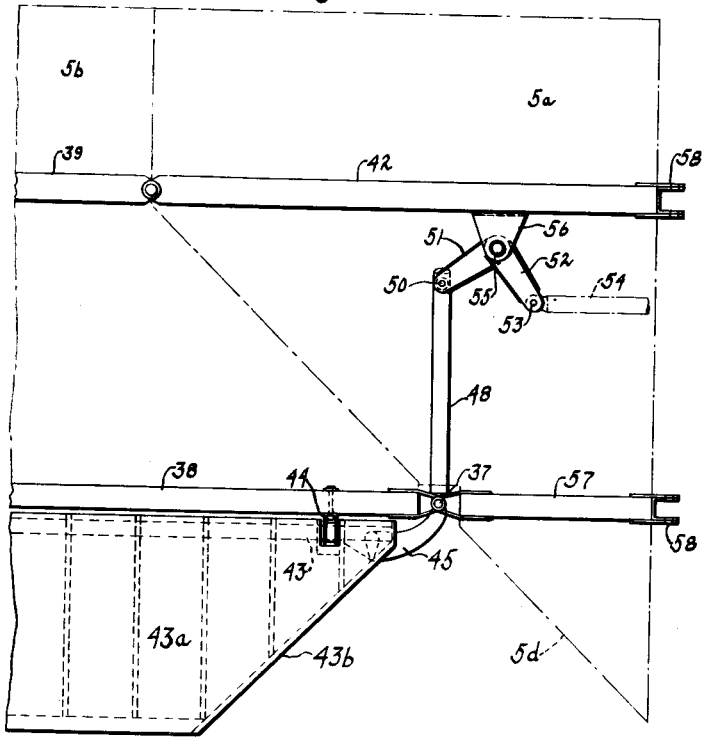
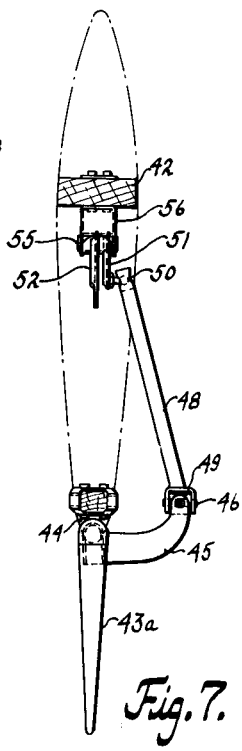
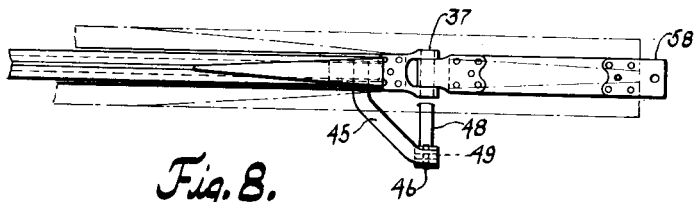
INVENTOR
Harris S. Campbell
BY
ATTORNEYS Patented Jan. 29, 1935

1,989,544

UNITED STATES PATENT OFFICE 1,989,544

AIRCRAFT OF THE ROTATIVE SUSTAINING-BLADE TYPE

Harris S. Campbell, Hatboro, Pa., assignor to Autogiro Company of America, Philadelphia, Pa., a corporation of Delaware Application April 8, 1931, Serial No. 528,538
Renewed July 30, 1932

13 Claims. (Cl. 244—15)

This invention relates to aircraft of the rotative sustaining-blade type, and more especially to craft of the general character disclosed and claimed in the copending application of Juan de la Cierva, Serial No. 414,901, filed December 18th, 1929, (issued as Patent 1,948,455) and is also readily applicable to the improved construction disclosed and claimed in Cierva application Serial No. 500,064, filed December 4th, 1930 (issued as Patent 1,947,901).

In general, such craft embody, in certain cooperative combinations, a primary sustaining wing system of normally air-rotated and flexibly arranged blades and a secondary sustaining wing system of substantially fixed and rigid nature, the requisite lifting reaction of both systems being, in normal flight, obtained by the forward propulsion of the craft as by an engine and propeller. Because the rotative wings or blades assume the primary burden of sustension in normal flight and substantially the entire burden in vertical descent, and for other reasons, they are normally of considerable span or "disc diameter" as compared with the dimensions of the craft, the consequence of which is that such craft require considerable storage space or hangar room.

My invention primarily contemplates the elimination of this disadvantage, and in fact involves the ability to house a craft of this type in even a smaller space or building than would accommodate an ordinary airplane of similar body size or capacity, notwithstanding the fact that the normal spread of the rotative-wings for a given size ship is larger than the normal spread of the fixed wings of an airplane of similar given size. This primary object of the present invention is particularly desirable in the type of craft here under consideration because of its inherent ability to get in and out of very small fields, which ability could not heretofore be fully taken advantage of by the average private owner because of the space and expense required for hangar facilities near his home.

I am aware that in certain early machines of the rotative-blade type, means were provided to cut down the space required for their storage, either by folding back a pair of opposed blades, or by folding the blades of the rotor together umbrella-wise, as in Patent No. 1,673,233 issued June 12, 1928 to Juan de la Cierva; or by collapsing the blades themselves, as in the copending application of Harold F. Pitcairn, Serial No. 373,379, filed June 24, 1929, (issued as Patent 1,884,848) but the present invention, as will hereinafter appear, involves decided improvements over such constructions, and further provides for the overcoming of problems incident to the use of more highly-developed blade mounting arrangements (which were not present in such machines) as well as to the use of supplemental fixed wings (which were likewise lacking in early craft of rotative-winged character).

In general, the present invention contemplates the possibility of swinging all the rotative wings back to lie over the tail of the craft, and in addition the swinging of the fixed wings back to lie against the fuselage, and further the neat interfitting of the two sets of wings with a box-like tail construction or empennage which latter can normally be employed as a slip-stream rotor starter; whereby the entire craft, including also its wide undercarriage as normally used on craft of this character, presents a compact arrangement for housing in a small hangar or garage.

Another important object of the invention is to make entirely possible and practicable the one-man folding and unfolding of the blades, and also of the fixed wings; and the swinging-around of all the blades, individually, in their rotative path for folding, so that their full weight need not be handled.

Still another object is to provide for folding back all the blades without disturbing the central rotor hub or axis member in any way; and further the folding back of the fixed wings without disturbing the undercarriage, or the wing bracing elements or disassembling the ailerons; and the complete "compacting" of the craft without removing any part thereof.

Other objects involve the simplification of the folding mechanism, both as to its structure and as to the operation thereof; while making the storing of the ship such a quick and convenient task as to be readily done in a few minutes, and at the same time making the re-preparation for flight simple and also fool-proof.

More specifically the invention involves: the provision, in a craft of the character stated (and as illustrated in the drawings), of means associated with, and to a considerable extent cooperating with, the present forms of articulation of the individual blades, for individually swinging-back all the blades of the rotor substantially from, or from the vicinity of, their normal articulations; the provision of supplemental movable fittings and locking-pins to accomplish said result; the provision of the individual devices for each blade at a point where they will be subject to substantially only tension stresses in flight, so that the weight of the parts may be kept at a minimum without danger of failure or fatigue; the provision of such means so arranged that proper assembly is practically assured when the ship is taken out, and further so that if one of the supplemental pins should be forgotten the rotor will still function substantially normally.

The invention further contemplates: neat cooperation of the required parts and their functions, with various forms of blade bracings or blade articulation control devices; overlying of one pair of blades, in substantially normal position, over a subjacent pair when folded; employment of the empennage to support and position the blades when folded; utilization of similar simple lock devices on both fixed and rotary wings; arrangement of the folding fixed wings in such wise as to protect the ailerons and their controls and without disconnecting the latter; utilization of a small non-folding section of the fixed wing as a stub-end adapted to cooperate with a cantilever fixed wing section, and to serve commonly as a landing-gear brace and as a very convenient step upon which the occupant can mount in order to reach most conveniently the rotor blade-joints.

How the foregoing, and other objects and advantages such as are incident to the invention or will occur to those skilled in this art, are obtained will be quite evident from the following description taken together with the accompanying drawings, in which latter:

Figure 1 is a plan view of a combined rotary and fixed-wing aircraft embodying the present invention, showing, in full lines, rotary and fixed wings arranged for housing in a small space, and, in dotted lines, the same wings arranged for flight and at the most advantageous angular position heretofore generally possible for storing such a ship (certain parts being omitted from this drawing for the sake of clarity);

Figure 3 is an enlarged detail plan of the central part of the rotor, (a part being in section), with the blades in full lines in normal position, and dotted lines in compacted position and showing blade cushioning means;

Figure 4 is a further enlarged fragmentary side elevation of one of the blade mounting devices of Figure 3, with part of the blade cushioning means omitted;

Figure 5 is a fragmentary bottom plan view of the locking mechanism of Figure 4;

Figure 6 is an enlarged, fragmentary top plan view of the inner portion of the left fixed wing of Figure 1, with certain parts omitted or shown in dot and dash lines;

Figure 7 is a view taken from the right of Figure 6; and

Figure 8 is a view of the structure of Figure 6, looking forwardly; the more detailed parts of Figures 6, 7 and 8 being omitted from Figures 1 and 2, because of the small scale of the latter.

Figure 1:
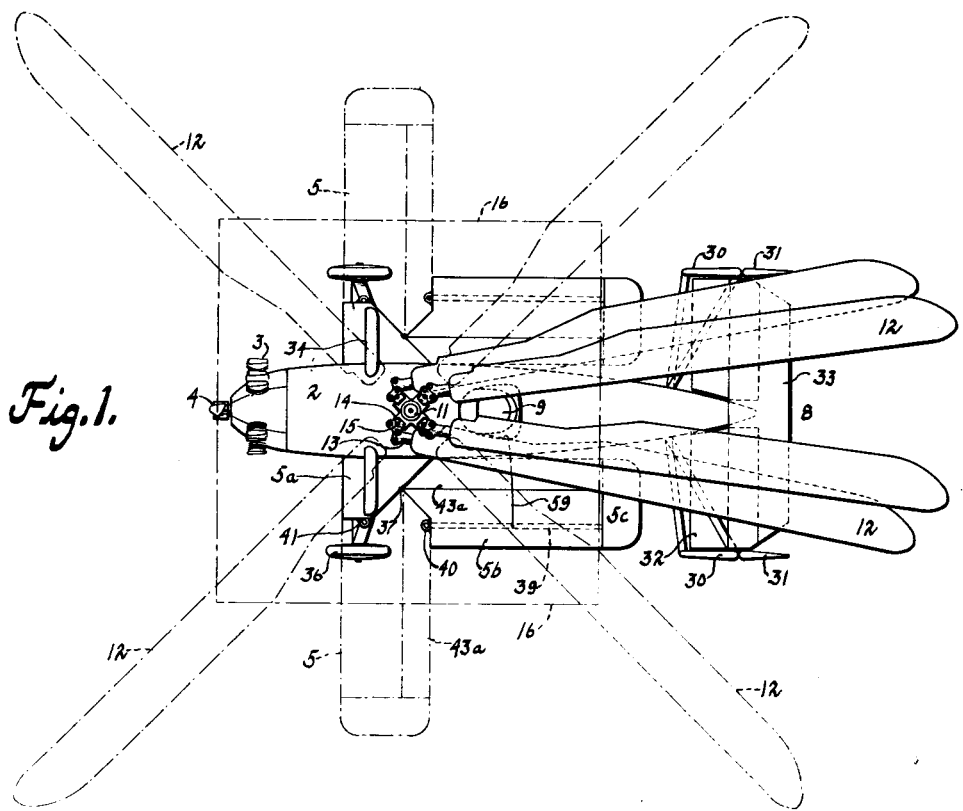
Figure 2:
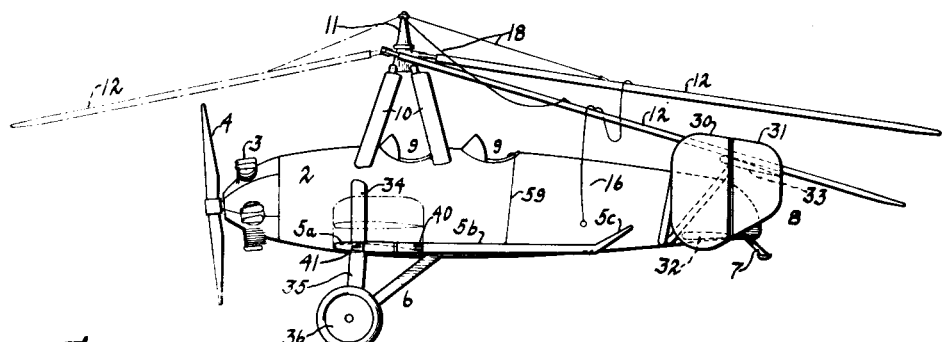
Figure 2 is a side elevational view of the construction of Figure 1.

By reference first to Figures 1 and 2, it will be seen that I have illustrated an aircraft of the rotative-winged type, in which forward propulsion means is provided, and in which the rotative wings or blades are adapted to be driven and pivotally swung, in flight, by relative air-flow, and further in which supplemental fixed wings, of small size, are provided.

The craft comprises, in general, a fuselage 2 having an engine and propeller 3, 4, in the nose, fixed wings 5, an undercarriage indicated generally at 6, tail skid 7, an empennage indicated generally at 8, cockpits 9, 9, and over the front cockpit a pylon composed of legs 10 (omitted from Figure 1 for the sake of clarity), a rotatably mounted hub structure 11 carrying a set of pivotally mounted sustaining blades 12. Only the rear cockpit is shown in Figure 1, but it will be understood that the forward cockpit underlies the rotor hub and pylon.

As will be seen from Figure 1, in which the blades 12 and the fixed wings 5 are shown in dot and dash lines in flight position, the craft would ordinarily require, for storage, a space equivalent to a square described by four lines extending from tip to tip of the four blades. Furthermore, if the ship were to be placed in a hangar where it was desirable to maintain the fuselage lengthwise with respect to the entrance or doorway, such an arrangement of the blades, i. e., as shown in dot and dash lines, would ordinarily be the most favorable position, as the space required, in a fore and aft direction especially, would be still greater if the blades were turned with one pair extending fore and aft and the other pair extending laterally. By my construction, however, as will hereinafter appear in greater detail, the space required for storage is bounded, lengthwise, by the propeller at the front and by the tips of the blades at the back, as shown in full line position; and the space required, transversely, is that which is bounded by the width of the undercarriage and empennage. The total storage space required by a machine built in accordance with my invention, is only approximately one-third the space required by the same machine without my invention.

Proceeding now with the details of the craft, it will be seen that I employ the desirable type of blade mounting such as that shown in application of Juan de la Cierva, Serial No. 145,655, filed November 1st, 1926, (issued as Patent 1,859,584) in which the main spar 13 of each blade is mounted on the rotative hub 11 by means of a horizontal articulation 14 and a vertical articulation 15 (see particularly, Figure 3). I may also utilize either a suitable yielding interconnection 16 between the blades, which may include some elastic element such as disclosed in the copending application of Juan de la Cierva, Serial No. 145,655, filed Nov. 1, 1926, or compressive cushions 17 as shown in Figure 3, similar to those shown in the copending application of Juan de la Cierva, Serial No. 496,872, filed Nov. 20, 1930, (issued as Patent 1,948,456) to yieldingly restrict interblade movements; and with either or both of these devices my invention is adapted to cooperate, as will further appear. My construction further freely permits the use of blade droop supports, such as the cables 18 (shown only in Figure 2, so as to avoid complication of the other figures).

How the present invention accomplishes its objects, while cooperating with other elements of construction just described, will now appear:

In Figure 3, it will be seen that the blade spar 13, instead of being directly mounted on the joint element 19 by means of the vertical pin 15, has an additional link or coupling member 20, the latter being mounted on the joint part 19 by means of pin 15 and being connected to the blade spar 13 by means of a pair of pins 21, as shown in Figures 3 and 4. In other words, I interpose one additional element between the hub 11 and the blade spar 13, to-wit: the link 20. The reacting brackets 22 and 23, which cooperate with the rubber block 17, are mounted respectively on the joint and link parts 19 and 20. The bracket 23 is preferably formed as an integral part of the link 20 and joins the upper and lower parts thereof, and said brackets 23 are each provided with a hollow space or pocket behind the interconnecting web or compression portion 24, so as to leave just sufficient clearance space in which the blade spar 13 may operate when the blade is swung back as shown in dot and dash position in Figure 3.

To release the blades, before swinging them back, it is only necessary to remove one locking pin 21 for each blade, the blades then being free to be swung back over the empennage, through an arc generally describing their ordinary path of travel, the cushions or bumpers 17 being left entirely undisturbed. To ensure proper retention of the locking pins, and thus of the blades, in flight, any suitable form of automatically retained pin may be employed, the one here shown being provided with a spring 25 between the head 26 of the pin and the surface of link 20, and with a lug or transverse pin 27, lockable by lugs 28 on the bottom of link 20, suitable slots 29 being cut in the pin end of spar 13 and in the links 20, to permit the removal and replacement of the locking pin. The small lugs 28 are positioned, as shown in Figures 4 and 5, on either side of the slot 29, so that by merely inserting the pin and turning it in either direction past a lug 28, and then releasing pressure on the pin, the spring 25 will hold the cross pin 27 against the bottom face of the link 20.

It should here be noted that substantially the only stress which plays on the locking or retaining pins 21, in flight, is the direct pull of the blade under the action of centrifugal force, since all other stresses are relieved by the articulative action on the usual blade pivots 14 and 15. Even if one locking pin should break, however, or should be omitted or left unlocked, the only result would be a slight disalignment of the particular blade, in flight, since the offset of the locking pins from the longitudinal axis of the blade spar is very slight.

In the construction shown in Figures 1 and 2, the blades are swung back, through a horizontal arc, by removing one of each pair of locking pins, as described, and by unhooking one of the resilient spacing cables 16, as shown in Figure 2. In a construction where the resilient or other stops are employed only at the hub, and the interconnections 16 are omitted, it is only necessary, of course, to remove the retaining pins.

As will be evident from Figure 2, fouling of the forward blades upon the articulations of the rear blades is obviated, by making use of the ordinary vertical and horizontal pivots, which permit two of the blades to be swung down beneath the other two, as shown in Figures 1 and 2, after the manner of certain insects.

The empennage, which includes stabilizers 30, rudders 31, horizontal stabilizer 32, elevator 33, provides for the positioning or retention of the blades laterally, when folded, as seen in Figure 1, and for the support of the two lower blades, whose droop cables 18 are slackened by swinging them around, as seen in Figure 2. This wide empennage, so constructed, serves not only the foregoing purposes, but also serves to deflect and guide the slip-stream, for starting purposes, as disclosed in the copending application of Juan de la Cierva, Serial No. 432,773, filed Mar. 3, 1930 (issued as Patent 1,948,514).

Referring now to the fixed wings 5, as seen in Figures 1, 2, 6, 7 and 8, I provide a fixed stub or wing portion 5a, braced by the lateral struts 34, to the fuselage, at a point adjacent the foot of the forward pylon leg 10, which serves also to mount the undercarriage struts 35 which carry the wheels 36. This provides a good wide undercarriage, which is desirable in this type of craft, due to its vertical landing ability, and further involves the advantage of not having to disturb the undercarriage or bracing struts to fold the fixed wings. The movable portion 5b of the fixed wings 5 is pivoted on a vertical hinge 37, the wing being of internally braced, or cantilever construction, with its rear beam 38 secured to said hinge and its front beam 39 carrying an apertured lug or series of them, 40, adapted to cooperate with the ears or lugs 41, through which a stout locking pin may be inserted, when the wings are in flight position.

To fold back the movable portion 5b of the fixed wing, if the usual aileron construction be employed, it is only necessary to provide a means for dropping both ailerons downwardly, as flaps, but I prefer to use the construction shown in Figures 1, 2, 6, 7 and 8 in which the stub portion 5a of the fixed wing is cut diagonally inwardly, to the rear of the main beam structure 42, and to cut the wing end of the aileron diagonally outwardly from its front spar 43. By this arrangement, neither the aileron hinges 44, nor the aileron control mechanism need be disturbed, provided only that the aileron control horn 45 be pivotally connected on a vertical axis 46 beneath the hinge axis 37. To connect the horn 45 to the control rod 48, I utilize the universal joint, which includes said vertical axis 46 and a transverse axis 49, the latter axis being necessary during normal flight operation of the ailerons. The control rod 48 extends upwardly through the bottom of the wing covering as shown in Figures 7 and 8 where it is connected by a ball joint 50 to an arm 51 of a bell-crank, the other arm 52 of which is connected by pivot joint 53 to control rod 54 extending into the fuselage. The mounting of this bell-crank is preferably by means of a vertical pivot 55 having a mounting 56 on the forward or main beam or spar 42 of the stub portion 5a of the fixed wing. Said beam 42, and the rear beam 57, may be connected to the fuselage longerons by suitable fittings 58, shown in Figure 6.

To fold back the fixed wing, for storage, it is only necessary to remove the locking pin connecting the ears or hinges 40 and 41, and swing back the wing in a horizontal arc against the side of the ship, in which position removable part 5b of the auxiliary wing, with its aileron 43a and its upturned tip 5c, lie within the space bounded by the side of the fuselage, the rear of the undercarriage and wing stub, and the front of the empennage, with the diagonal surface 43b of the aileron abutting the diagonal surface 5d of the stub of the wing. If desired, a supporting wire 59 may be hooked from the front beam 39 of the wing section 5b, and to the side of the fuselage or cockpit, as shown in Figures 1 and 2. This wire may readily be swung back into the cockpit, the wing swung forwardly, and its locking pin inserted, when it is desired to take the machine out.

The foregoing description sets forth in detail, a preferred construction by which the objects of the invention may be obtained, and it will now be evident that the mechanism is very simple to use and results in numerous advantages set forth fully in the forepart of this specification.

What I claim is:—

1. In an aircraft of the character described, foldable rotary wings each constructed to be individually foldable rearwardly over the craft, and fixed wings in part foldable and in part stationary, the former part being formed and mounted to lie entirely beneath the plane of rest of the rotary wings when folded and the latter part being formed as a step on which to mount whereby readily to reach the rotary wings for folding and unfolding them.

2. In an aircraft of the character described, a sustaining rotor with a plurality of blades, a pivotal articulation for each blade for flight operation, and one or more additional pivots for each blade for folding purposes, releasable means adjacent the roots of the blades normally preventing such folding, said folding pivots being positioned to provide for individual folding of all the blades back over the body of the craft, with their planes substantially parallel, after the manner of the folded wings of an insect.

3. In an aircraft of the character described, a sustaining rotor with a plurality of blades, a dual pivotal articulation for each blade for flight operation, and, for an individual blade or blades, a link and a pair of pivots, at least one of the pivots of the pair being removable, so that the blade may be swung on the other pivot of the pair for folding purposes.

4. In an aircraft of the character described, a sustaining rotor with a plurality of blades, a pivotal articulation for each blade for flight operation, and one or more removable pivots for each blade for folding purposes, said removable pivot being formed as a quick-detachable locking device.

5. In an aircraft of the character described, a sustaining rotor with a plurality of blades, means for folding them, and an empennage arranged to support at least some of them when folded.

6. In an aircraft of the character described, a sustaining rotor with a plurality of blades, means for folding them, and an empennage arranged to support at least some of them when folded, and to retain them laterally.

7. In an aircraft of the character described, a sustaining rotor with a plurality of blades, means for folding them, droop supports to support the extended blades when at rest, and means on the body of the craft arranged to support at least some of them when folded.

8. In an aircraft, a rotative blade system, having pivot means including vertical pivots for the blades, stop means cooperating with the blades and pivot means to control blade movements, and means for effecting folding of the blades generally horizontally without disturbing the relationship of the pivot means and stop means.

9. In an aircraft of the rotative-wing type, a normally freely-rotative common upright hub structure, a plurality of wings located in spaced-apart relation thereabout in position to be rotated by the action of relative air-flow in flight, a substantially horizontal pivot axis for each wing securing it to the hub with freedom for individual up-and-down flapping to compensate for variable forces on the wing in flight, an extension link for each wing connected to the horizontal pivot, a pivot block for each wing, a vertical pivot connecting said block to said link to provide for fore-and-aft movements of the wings in their rotative path during flight, and for each wing a pair of readily displaceable pivot devices connecting the root end of the wing to said block at a zone radially outwardly beyond the flight pivots, each wing being capable of hinging around either one of its said pivot devices upon displacement of the other, whereby all the wings may be individually swung rearwardly over the body of the craft for folding purposes.

10. For an autorotative-wing-aircraft having a sustaining rotor including a common hub with a plurality of wings, a wing mounting comprising a pivot device providing for force-compensating movements of the wing in flight, means mounting said pivot device on the hub, a wing fitting mounting the wing on said pivot device, limiting means positioned adjacent the hub and reacting against said wing fitting to normally limit the said wing movements within a restricted range, and wing-folding means constructed to extend the range of movement of the individual wing beyond said limits.

11. In an aircraft, a sustaining rotor including a rotor hub structure, a plurality of sustaining blades or wings pivotally attached to the hub structure on axes providing for force-compensating movements of the wings during flight operation, control means positioned closely adjacent to the hub structure and reacting between the wings and the hub structure to control pivotal blade movements, and manually operable means associated with the means last mentioned at a point closely adjacent to the hub structure whereby the control means may be rendered ineffective and thus to provide for relatively great pivotal movements of the wings to permit folding thereof for storage purposes.

12. In an aircraft of the rotary wing type, a sustaining rotor with a plurality of blades, a pivotal mounting for each blade for flight operation, and, for an individual blade or blades, a connecting fitting and a pair of pins located radially outwardly from said pivotal mounting, at least one of the pins of the pair being removable, so that the blade may be swung on the other of said pins as a pivot for folding purposes.

13. In an aircraft of the rotative-wing type, a normally freely-rotative common upright hub structure, a plurality of wings located in equispaced relation thereabout in position to be rotated by the action of relative air-flow in flight, (the angular spacing between adjacent wings being less than 180°) a pivot mounting for each wing lying in a substantially horizontal plane and pivotally mounting the wing on the hub for variation in aerodynamic angle of attack to compensate for variable forces acting on the wing in flight, and other pivot mechanism having pivot axes lying in substantially vertical planes connecting all the wings to their first-mentioned pivot mountings, said mechanism being constructed and positioned to provide for individual wing movements generally fore-and-aft in their rotative path during flight and including for each wing at least one pivot positioned at such distance from the horizontal pivot mounting as to provide for individual pivotal folding of the wings, and releasable means positioned adjacent said folding pivots for normally preventing such folding.

HARRIS S. CAMPBELL.